2,952,648

PRODUCTION OF RESINOUS POLYAMIDES BY THE REACTION OF A MONOMERIC POLYAMINE WITH THE PRODUCT OF A STYRENE AND A DEHYDRATED CASTOR OIL FATTY ACID

Geoffrey Swann, Hunts Cross, Woolton, and Peter Gilbert Evans, Liverpool, England, assignors to Beck, Koller & Company (England) Limited, Liverpool, England, a British company No Drawing. Filed Jan. 10, 1957, Ser. No. 633,390

Claims priority, application Great Britain Jan. 10, 1956

7 Claims. (Cl. 260—23)

This invention relates to new polyamides and their production.

The new polyamides are condensation products of one or more polyamines with a co-polymerization product of styrene or a hydrocarbon-substituted styrene and dehydrated castor oil fatty acids.

Polyamines which may be employed include diethylene triamine, ethylene diamine, propylene diamine, hexamethylene diamine, p-phenylene diamine, triethylene tetramine and p,p'-diaminodiphenyl methane.

The above-defined co-polymerization products can be produced by heating the dehydrated castor oil fatty acids with styrene or a hydrocarbon-substituted styrene such as alpha-methyl styrene or vinyl toluene, preferably in the presence of a free-radical-forming polymerization catalyst. Preferably this catalyst is an organic peroxide and is employed in conjunction with a non-metallic reducing polymerization inhibitor; the conjoint use of such catalyst and inhibitor promotes the formation of mixtures of dibasic and polybasic acids. The inhibitor may suitably be an alkyl mercaptan containing from 6 to 12 carbon atoms.

According to the invention the new polyamides are made by heating one or more polyamines at elevated temperature with the said co-polymerization product.

The new polyamides range from soft, sticky, balsam-like materials to higher-melting, tough or hard and brittle resins according to composition. They are soluble in such mixed solvents as xylene/butanol and some of them are dissolved in single aromatic solvents like toluene and xylene. They are thermoplastic and have film-forming properties.

The following examples illustrate the production of the new polyamides.

Example 1

(*a*) Into a suitable vessel were charged, with stirring, 500 gm. of high conjugated dehydrated castor oil fatty acids, 185 gm. of styrene monomer and 0.5 ml. of lauryl mercaptan. After the addition of 0.5 ml. of di-tertiary butyl peroxide, heat was applied and the charge was raised to boiling point. After boiling under reflux for about four hours the viscosity of the charge had reached B on the Gardner-Holdt scale and a further 0.5 ml. of di-tertiary butyl peroxide was added. After boiling under reflux for a further period of approximately 15 hours the viscosity had risen to U–VV and a further 0.25 ml. of catalyst was added. After 7–8 hours the viscosity had reached X+ and a final quantity of 0.25 ml. of di-tertiary butyl peroxide catalyst was added, when a final 7–8 hours boiling under reflux raised the viscosity to X–YY. The product was not subjected to distillation under reduced pressure when about 12 gm. of distillate were collected.

The product was found to have the following characteristics:

Viscosity _____ $Z_1Z_1$–$Z_2$ Gardner-Holdt).
Colour_____ 5.
Mineral spirits to 1.7_____ (v./v.)
Acid value_____ 152.

The product is a mixture containing dibasic and polybasic acids.

(*b*) 350 gm. of the above product, 97 gm. of diethylene triamine and 0.1 gm. of antifoam agent were charged into a suitable vessel; a stream of nitrogen gas was introduced and the mixture was heated with stirring under a water-cooled reflux condenser. After about 1½ hours the water-cooled condenser was replaced by an air-cooled condenser, the temperature of the charge was raised and the water of reaction was allowed to escape through the condenser. Heating was stopped and the product pressed out when the acid value had dropped to below 5.

This product had the following characteristics:

Viscosity_____ C–D (60% 1:1 butanol:toluene).
Colour_____ 7–8 (60% 1:1 butanol:toluene).
Acid value_____ 4.5.

Example 2

(*a*) Into a suitable vessel were charged with stirring 2810 gm. of high conjugated dehydrated castor oil fatty acids, 520 gm. of styrene monomer and 1.4 mls. of lauryl mercaptan. The mixture was warmed until homogeneous and then 3.0 mls. of di-tertiary butyl peroxide were added and the charge raised to its boiling point. After boiling under reflux for 4 to 5 hours the viscosity began to increase and a second lot of 3.0 mls. of di-tertiary butyl peroxide were added. Boiling under reflux with periodic additions of di-tertiary butyl peroxide was continued until finally after a period of about 40 hours in all and a total addition of 12.0 mls. of peroxide, the product had reached a viscosity of K (Gardner-Holdt scale). It was then subjected to a distillation process under reduced pressure when 30 mls. of distillate were collected and discarded. The product had the following characteristics:

Viscosity_____ Q (Gardner-Holdt scale).
Acid value_____ 158, 159.5.

(*b*) 300 gm. of the above product, 87 gm. of diethylene triamine and 0.1 gm. of antifoam agent were charged into a suitable vessel. A stream of nitrogen gas was introduced and the mixture was heated with stirring under a water-cooled reflux condenser. After boiling under reflux for about 1½ hours the water-cooled condenser was replaced by an air-cooled condenser. The temperature of the charge was raised and the water of reaction allowed to escape through the condenser. Heating was stopped when the acid value of the product had dropped to below 5. This product was a viscous, cloudy resin and had the following characteristics:

Viscosity_____ A—(60% in 1:1 butanol:toluene)
                              (Gardner-Holdt scale).
Colour_____ 10 (Gardner-Holdt scale).
Acid value_____ 1.6.

Example 3

300 gm. of the product produced according to Example 2(*a*), 30 gm. of 85.4% aqueous ethylene diamine solution and 0.1 gm. of antifoam agent were charged into a suitable vessel as in Example 2(*b*). After 1½ hours heating the water-cooled condenser was replaced by an air-cooled one and the temperature was raised. After about 2¾ hours a further 5.0 gm. of aqueous ethylene diamine solution were added and heating was continued until the acid value of the product had dropped to a low value. The product, a waxy solid, had the following characteristics:

Viscosity _____ A$_4$ (35% in 1:1 butanol/toluene) (Gardner-Holdt scale).
Colour _____ 12, 12–13 (Gardner-Holdt scale).
Acid value _____ 6.4.
Melting point _____ 110, 111° C. (B. & R.).

*Example 4*

323 gm. of the product produced according to Example 2(a), 90 gm. of p,p′-diaminodiphenylmethane and 0.1 gm. of antifoam agent were charged as in Example 2(b). The mixture was heated for 1½ hours under a water-cooled condenser and thereafter under an air-cooled condenser until the acid value had dropped to a low value. The product which was a dark-coloured solid had the following characteristics:

Viscosity _____ A$_4$ (35% in 1:1 butanol/toluene) (Gardner-Holdt scale).
Colour _____ >18 (>=greater than) (Gardner-Holdt scale).
Acid value _____ 16.8.
Melting point _____ 108° C. (B. & R.).

*Example 5*

300 gm. of the condensation product produced according to Example 1(a), 26 gm. of 85.4% aqueous ethylene diamine solution were charged as in Example 1(b). After heating under a water-cooled condenser for 1½ hours and an air-cooled condenser for about 2½ hours, a further 5.5 gm. of ethylene diamine solutions were added and heating was continued until the acid number of the product fell to a low figure. The product which was a cloudy, brittle material had the following characteristics:

Viscosity _____ A$_4$ (35% in 1:1 butanol/toluene) (Gardner-Holdt scale).
Colour _____ 11–12 (Gardner-Holdt scale).
Acid number _____ 5.3.
Melting point _____ 110° C. (B. & R.).

*Example 6*

300 gm. of the condensation product produced according to Example 1(a), 70 gm. of diethylene triamine and 5.3 gm. of 85.4% aqueous ethylene diamine solution were charged as in Example 1(b). After heating under a water-cooled condenser for 1½ hours, the condenser was exchanged for an air-cooled one. The temperature was raised and reaction continued until the acid number reached a low value. The product, a cloudy, viscous balsam had the following characteristics:

Viscosity _____ B (60% in 1:1 butanol/toluene) (Gardner-Holdt scale).
Colour _____ 9 (Gardner-Holdt scale).
Acid value _____ 2.7.

*Example 7*

Into a suitable vessel were charged with stirring 703 gm. of high conjugated dehydrated castor oil fatty acids, 520 gm. of styrene monomer and 1.2 mls. of lauryl mercaptan. 1.2 mls. of di-tertiary butyl peroxide were added and the mixture blended under reflux. Refluxing and periodic additions of di-tertiary butyl peroxide were continued until finally after a total period of refluxing of 12–13 hours and a total addition of 3.6 mls. of di-tertiary butyl peroxide, the product had reached a viscosity of Z$_2$–Z$_3$ (Gardner-Holdt scale). It was then distilled under reduced pressure when a few mls. of distillate were collected and discarded. The product had the following characteristics:

Viscosity _____ Z$_5$–Z$_6$ (Gardner-Holdt scale).
Acid value _____ 110, 111.

300 gm. of the above product, 60.5 gm. of diethylene triamine and 0.1 gm. of antifoam agent were charged as in the preceding examples. After heating under a water-cooled condenser for 1½ hours, this was replaced by an air-cooled condenser. The charge was then heated until the acid number had dropped to a low figure. The product, which was a cloudy, low-melting solid had the following characteristics:

Viscosity _____ H (60% in 1:1 butanol/toluene) (Gardner-Holdt scale).
Acid value _____ 1.8.

*Example 8*

Into a suitable vessel were charged 2250 gm. of high conjugated dehydrated castor oil fatty acid, 945 gm. of vinyl toluene and 2.25 mls. of lauryl mercaptan. 2.5 mls. of di-tertiary butyl peroxide were then added and the charge boiled under reflux. Further additions of di-tertiary butyl peroxide were made at intervals and boiling under reflux was continued until after a total period of 32–33 hours and the addition of 9.0 mls. of di-tertiary butyl peroxide a viscosity of X+ (Gardner-Holdt scale) was reached. The product was then distilled under diminished pressure when 88 mls. of distillate were collected and discarded. The final product had the following characteristics:

Viscosity _____ Z (Gardner-Holdt scale).
Colour _____ 5–6 (Gardner-Holdt scale).
Acid value _____ 138.

300 gm. of the above product, 30.0 gm. of 85.4% aqueous ethylene diamine solution and 0.1 gm. of antifoam agent were charged as in the preceding examples. After heating for 1½ hours under a water-cooled condenser this was replaced by an air-cooled condenser and the charge was heated until the acid number had dropped to a low value. The product, a cloudy solid mass, had the following characteristics:

Viscosity _____ A$_4$ (35% in 1:1 butanol/toluene) (Gardner-Holdt scale).
Colour _____ 11.
Acid value _____ 5.
Melting point _____ 110; 111° C. (B. & R.).

*Example 9*

Into a suitable vessel were charged with stirring 500 gm. of low conjugated dehydrated castor oil fatty acid, 185 gm. of styrene monomer and 0.5 ml. of lauryl mercaptan. Co-polymerisation under the influence of di-tertiary butyl peroxide was carried out as in the previous examples. After a period of about 36 hours boiling under reflux and a total consumption of 1.75 mls. of di-tertiary butyl peroxide, the viscosity of the product had reached T–U (Gardner-Holdt scale). It was then distilled under reduced pressure when 15 mls. of distillate were collected and discarded. The final product had the following characteristics:

Viscosity _____ V–WW (Gardner-Holdt scale).
Acid value _____ 148.

300 gm. of the above product, 82 gm. of diethylene triamine and 0.1 gm. of antifoam agent were charged under nitrogen gas with stirring as in the previous examples. The reactants were heated under a water-cooled condenser for 1½ hours and then under an air-cooled condenser until the acid number had dropped to a low figure. The final product, a viscous liquid, had the following characteristics:

Viscosity _____ A$_1$–A (60% in 1:1 butanol/toluene) (Gardner-Holdt scale).
Colour _____ 7+ (Gardner-Holdt scale).
Acid value _____ 2.5.

The high conjugated dehydrated castor oil fatty acids referred to in Examples 1 to 8 contained 50 to 52% of conjugated fatty acids and the low conjugated dehydrated castor oil fatty acids referred to in Example 9 contained 35 to 40% of conjugated fatty acids.

What we claim is:

1. A process of forming a new resinous polyamide which comprises condensing by heating, under reflux, a mixture of (A) a monomeric organic polyamine with (B) a copolymerization product produced by heating, under reflux, a charge comprising essentially (1) a monomeric substance selected from a group consisting of styrene, alpha methylstyrene and vinyl toluene and (2) dehydrated castor oil fatty acids, the charge being heated to the boiling point of the monomeric substance, the molar range of substance (1) to dehydrated castor oil fatty acid being between 2:1 and 1:2, the ratio of (A) polyamine to (B) copolymer being not greater than 1 mol of polyamine per mol of carboxy group, and the lower limit of polyamine to acid being that quantity containing one equivalent of primary amino group per one carboxyl group in the acid component.

2. A process as set forth in claim 1 wherein substance (1) is styrene.

3. A process as set forth in claim 1 wherein substance (1) is vinyl toluene.

4. A process as set forth in claim 1 wherein (A) is diethylene triamine.

5. A process as set forth in claim 1 wherein (A) is ethylene diamine.

6. A process as set forth in claim 1 wherein (A) is p,p'-diaminodiphenylmethane.

7. A new resinous polyamide produced in accordance with the process of claim 1.

References Cited in the file of this patent

UNITED STATES PATENTS

| | | |
|---|---|---|
| 2,648,534 | Young et al. | Apr. 26, 1949 |
| 2,767,089 | Renfew et al. | Oct. 16, 1956 |